Dec. 5, 1933.    G. A. PAGE    1,938,085
ZONE FILTER
Filed July 27, 1931    5 Sheets-Sheet 1

INVENTOR-
George Allen Page

Dec. 5, 1933.  G. A. PAGE  1,938,085
ZONE FILTER
Filed July 27, 1931   5 Sheets-Sheet 3

FIG-5-

INVENTOR
George Allen Page

INVENTOR—
George Allen Page

Dec. 5, 1933.  G. A. PAGE  1,938,085
ZONE FILTER
Filed July 27, 1931  5 Sheets-Sheet 5

INVENTOR
George Allen Page

Patented Dec. 5, 1933

1,938,085

UNITED STATES PATENT OFFICE 1,938,085

ZONE FILTER

George Allen Page, Freehold, N. J., Nanon Ashcraft Page executrix of said George Allen Page, deceased Application July 27, 1931. Serial No. 553,266

6 Claims. (Cl. 88—41)

My invention relates to optics and has for an object to provide an optical unit for intercepting zonal radiation from the object field en route to the image plane and by-passing the extra-zonal radiation, thereby diminishing the illumination of a zone of the image without otherwise affecting the image. Another object is to provide a filter adapted, when interposed in a beam of divergent light, to intercept or absorb light according to the angle at which the light rays are incident upon the entrance surface of the filter. Another object is to provide a simple, efficient, durable and consistent filter construction that will permit of a very wide variety of filters to be designed to meet different conditions. Another object is to provide a filter adapted to be co-ordinated by adjustment to differently situated zones. Another object is to provide a filter that may be embodied in a lens. Another object is to provide a filter that is adapted to reduce or extinguish the illumination of unduly bright areas of the image field without unduly diminishing the illumination of the remainder of the image field. And still another object is to provide a filter that is adapted to relieve the human eye of glare and safeguard it from physiologically dangerous radiation, without unduly interfering with freedom of vision.

To these and other ends my invention consists in the art of zone filtering and the organization and structure of a zone filter, a single embodiment of which is shown in the accompanying drawings, wherein:

Figs. 4 to 9 inclusive disclose the construction and manipulation of the filter.

Figs. 10 and 11 disclose the operation of the filter.

The radiation from the illuminated object field passing through an objective or image forming system may be presumed to be the genesis of the image and its source of illumination. Thus if the radiation of a zone of the object field were to be modified (say, as to wave length components), diminished, or extinguished: then the corresponding zone of the image field would be correspondingly affected. According to the present invention the same result is obtained by zonal filtration. The zonal radiation from the object field that is to be diminished relatively to the extra-zonal radiation or extinguished, is intercepted en route to the image plane by the filter, and this zonal radiation is more or less completely absorbed according to the design of the filter, whereas the extra-zonal radiation is by-passed by the filter and continues on its passage to the image plane unaffected. This, together with the technique and art of analytical and applied zone filtering and of zone filter construction is comprehended in this invention.

Applied zone filtering is obviously indicated in ophthalmic optics in the majority of cases of glare, to protect the retina, to afford comfort and relieve fatigue, and to make vision possible and more effective. Glare is the phenomena whereby vision is made difficult or impossible due to excessive illumination. With heterogeneous glare the diaphragming action of the iris automatically reduces the image illumination to a normal value provided the excess of illumination does not exceed the range of adaptibility of the normal eye. Beyond this point, a neutral absorbtive screen of proper value will extend the range of the eye as far as necessary. For heterogeneously distributed objectionable radiations of particular quality as to wave length, a selective ray filter will adapt the illumination to the eye. But wherever the abnormality is zonal, a zone filter is indicated, and that applies whether the disturbing or critical condition originates in the image plane, as on the retina, or in the object field as in the field of view.

A three dimensional view or object field is projected upon the retina as a two dimensional plane image (assumed as flat for convenience), subject to the rules of perspective which in turn may be resolved into a vector diagram analysis with the eye center and horizon of the image plane as the origin and zero axis of the vector diagram respectively. In some instances it is convenient, for purposes of analysis, to project the retinal image plane before the eye lens as a virtual image or picture plane. This analysis facilitates a tangible conception of and prepares the way for a mathematical manipulation of many of the most difficult, trying and dangerous problems of glare; and the zonal nature of such problems is commonly evident.

Thus in the case of a concentrated high light or light source, stationary with respect to the field of view and image field, the glare element is substantially a point. This point may be either central, at the vector origin, or it may be eccentric, in which latter case it is situated on some vector. However, since all ordinary light sources have sensible dimension in the image plane, the point element becomes a bright spot, the contour of which is determined by the shape and the perspective projection of the light source. An electric welding arc, or the sun, provide examples of "spot glare".

In the case of a light source moving or changing its position with relation to the view field and image field, the glare element is the trace or trajectory of the light source. Just as in the case of a row of lights, the individual light sources merge into a line. This line may be rectilinear, curvilinear or orbital. Since the eye center and the horizon of the image plane are the criteria of location, the perspective projections of these traces upon the image or picture plane are located with reference to the origin and vectors of the image plane as in "spot glare". Likewise, the sensible dimensions of the light source or sources develop the linear light trace projection into a band, the width of which is determined by the instantaneous diameter of the light source image, according to its perspective projection from point to point of its trace. A locomotive headlight approaching the observer, a row of street lights or lighted shop windows, and the apparent movement of the sun as the line of vision is oriented provide examples of "band glare".

Both "spot glare" and "band glare" develop into and may conveniently be considered as special cases of "zonal glare" which specifically includes a cluster of spot glare areas, a bunch of band glare areas, a large homogeneous glare zone or a combination of these. A spot glare area may be considered as a small concentrated zone; a band glare area as an elongated zone; an endless or orbital band area as a zone having an opening in it; a pair of intersecting convergent bands as a V or bifurcated zone; and so on. Within wide limits, various cases of glare can be resolved into single or multiple zonal glare. The remaining cases approach heterogeneous glare of such high order as to constitute in the limiting condition homogeneous illumination within the scope of filters of the prior art and the limits of tolerance of the human eye or other optical system.

Figure 1:
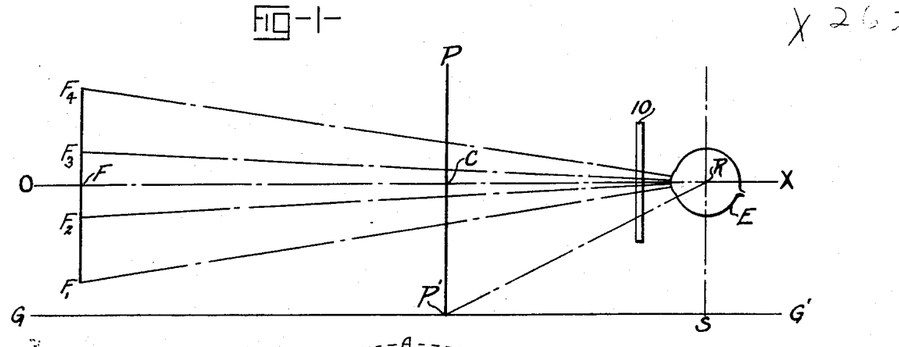
Figs. 1, 2 and 3 are diagrams analyzing a typical problem of zone filtering and developing a technique for constructing zone filters.

A definite and consistent attribute of zonal glare is the view angle or angle of vision that each of the co-ordinate axes of the zone subtend. This is illustrated in the diagram, Fig. 1, wherein E is the observer's eye (related to the diagrams to satisfy Gullstrand's condition for orthoscopy), 10 is a zone filter plate in the normal position of an ophthalmic lens before the eye, $F_1$—$F_4$ is a section or meridian of an object plane. The normal optical axis O—X extends thru the center F of the object plane meridian, thru the vertices or poles of the anterior and posterior surfaces of the filter 10 and thru the center of rotation R of the eye. Let the area represented by the portion $F_2$—$F_3$ of the object field meridian be a glare zone to be filtered and the areas represented by $F_1$—$F_2$ and $F_3$—$F_4$ or beyond, marginally, be the extrazonal field that is to be viewed unaffected. The zonal glare indicated in Fig. 1 is assumed as symmetrically central or polar and therefore the aspect angle of the zonal rays will vary from normal incidence coinciding with the optical axis, which is measured as zero angular value, to a maximum inclination clockwise and a maximum inclination counter-clockwise (as viewed in Fig. 1), the inclination in each case being equal. For convenience the clockwise inclination (Gleichen's sign convention) of the aspect angle will be denoted plus and the counter-clockwise inclination minus. The maximum value for the aspect angle of the zonal radiation is determined by the following relation:

$$\tan\{\pm\}\alpha = \frac{z+a}{2d} \quad \text{(Eq. 1.)}$$

where $\alpha$ is the aspect angle as $\angle FRF_3$ or $\angle FRF_2$ in Fig. 1 (the former being + and the latter —); $z$ being the zonal width as $F_2$—$F_3$; "$a$" being the diameter of the pupillary aperture or entrance pupil of the objective of the image forming system substituting the eye E; and $d$ being the distance along the optical axis between the entrance surface of the entrance pupil and the object field as the distance from the corneal vertex to F in Fig. 1.

Figure 5:
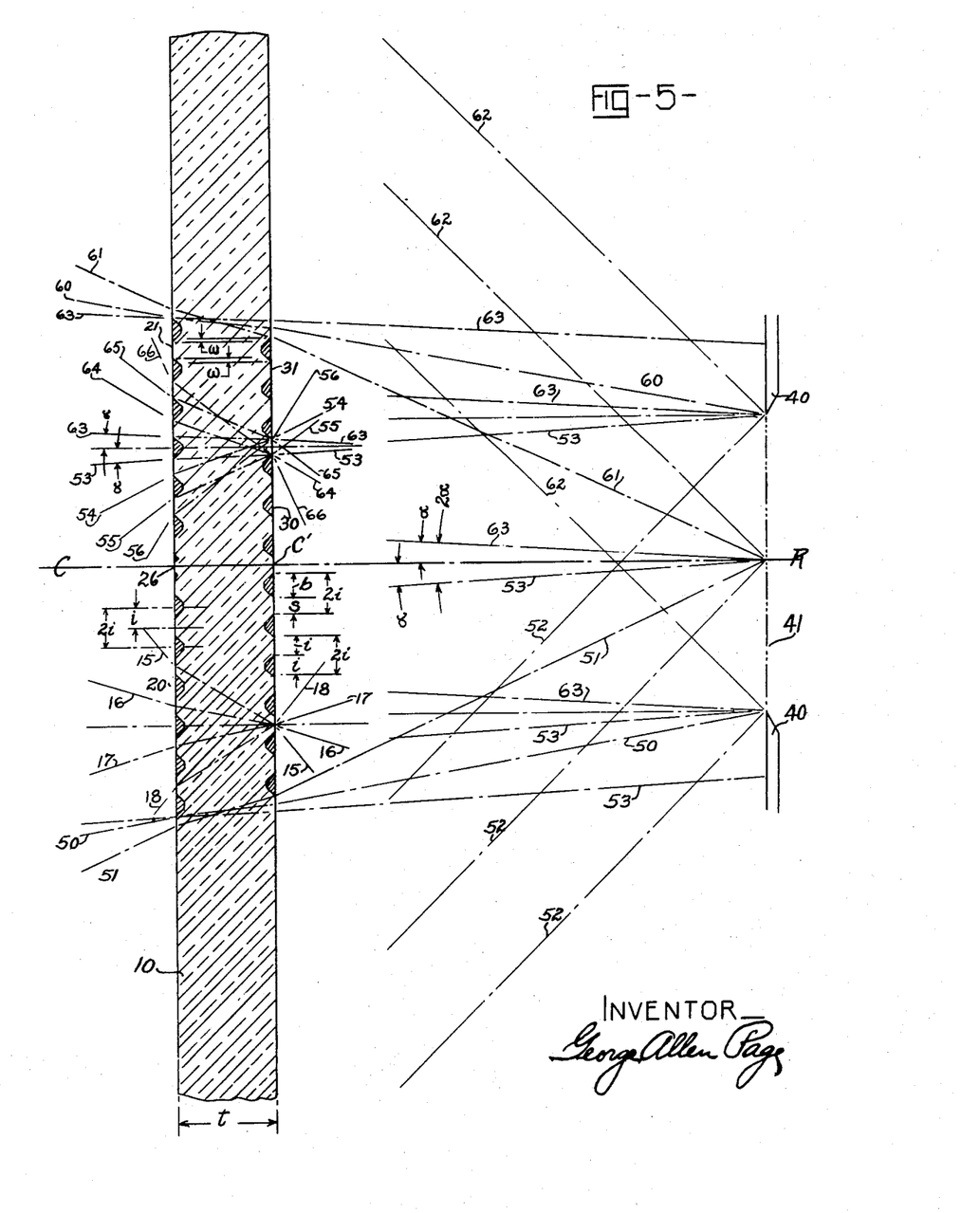
Figs. 5 and 6 being respectively sections of the filter grating and of a portion of its embodying glass support, diagrammatically shown in co-operative relation to the entrance pupil of the eye.

It will now be understood that if the filter 10 be so constructed that no light having an aspect angle of less than $\alpha$ will be permitted to pass without interception but all light having an aspect angle of more than $\alpha$ will be by-passed, then the filter will be able to control the passage of or filter the zonal radiation selectively with respect to the extra-zonal radiation. Furthermore, it will be observed by reference to Fig. 1 that the filter medium need not be co-extensive with the entire filter plate but need occupy only, say, a central portion the diameter of which is indicated by $$l = a + c2\tan\alpha \quad \text{(Eq. 2.)}$$

where $l$ denotes the filter labyrinth or maze diameter, $c$ denotes the corneal distance between the vertex of the cornea and the adjacent vertex of the filter plate or lens disc and the other symbols are as denoted for Eq. 1. Thus far only one meridian of the zone has been examined into, but as will be developed presently all meridians of the zone must be provided for. If, as in the case of spot welding, we assume the zone $F_2$—$F_3$ as substantially circular, then all meridians are identical and we have the special case of polar or central spot glare. In a simple case like this further analysis is avoidable and the problem may be satisfied by regarding the zone and the corresponding filter maze as developed by rotating the meridians shown in Fig. 1 about the optical axis. Thus, anticipating the detailed description of Fig. 5 and its development which follow in logical inductive order, it will be sufficient here to state that the filter structure shown in section in said figure could be rotated and the grid patterns constituting the filler would become a nest of circular rings having the same optical characteristics in all meridians. This method altho simple in the case of a centered circular zone, becomes complex in the case of an elongated, eccentric or irregular zone. In the latter case, instead of assuming an infinite number of meridians with the filter or maze structure tangential throughout, as is the case in developing a medium by revolution of a meridian, a limited number of critical meridians may be assumed and the filter structure developed for each and then assembled or blended into a complete maze area. This is still the vector and tangent system of zone analysis and maze synthesis and develops a maze system simulating either a triangular or a polygonal figure, a shape simulating the contour of the zone. For practical reasons, a transverse coordinate system of zone analysis and maze synthesis is preferred, and a system of perspective projection for the location, proportioning and contouring of the maze is combined with direct mathematical treatment in critical meridians and for special elements. This method applied to the complex practical problem of automobile headlight glare, develops a universal technique for the application of zone filtering.

Accordingly the single specific embodiment of my invention set forth in detail in the drawings and the following description is designed around the problem of automobile headlight glare, and because of the adaptability of the filter, it is competent to relieve the motorist also of all other forms of zonal glare to which he is exposed in day or night driving. By the same token, the same specific form of filter is ideally suited to many other uses besides motoring and a comparatively few generic designs will cover the entire field of zonal glare.

Figure 11:
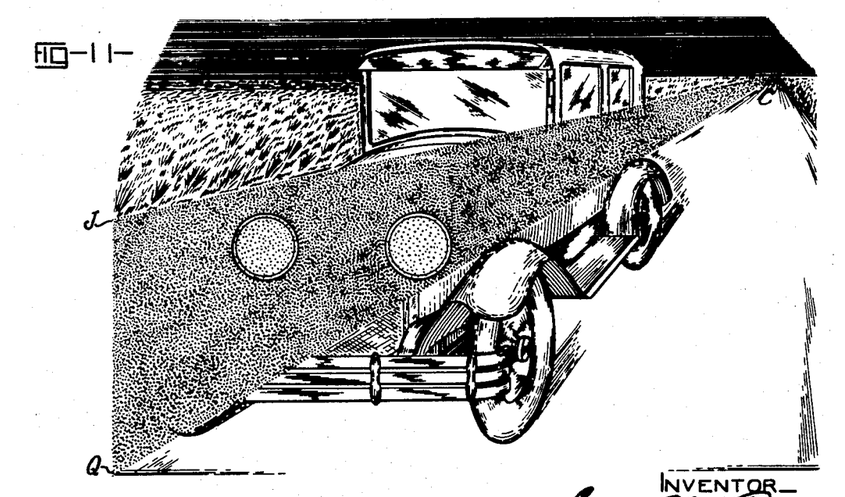

The headlight glare problem of a driving motorist is best analyzed by an application of the principles of parallel perspective because his field of view is in this projection. Fig. 11 will prove this and Figs. 1, 2 and 3 analyze the problem from this standpoint.

Figure 2:
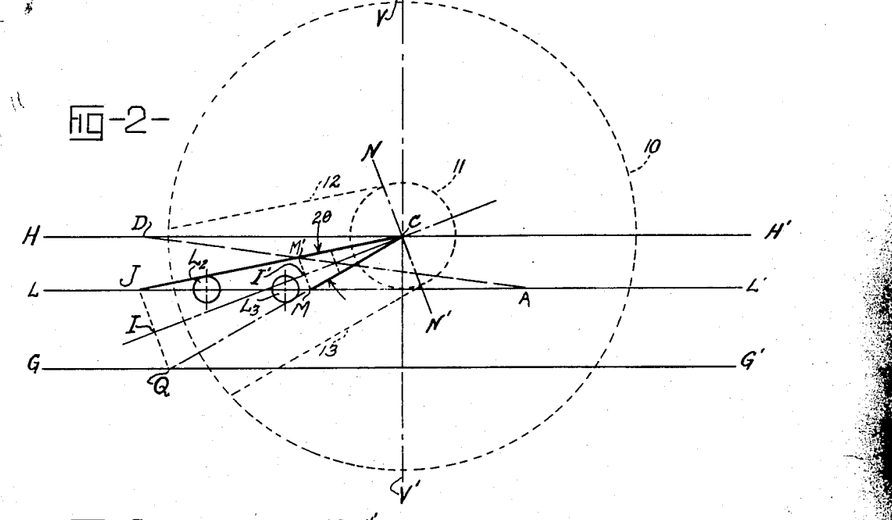

In Fig. 1 let R be the eyepoint of the motorist driving a car, whose field of view is developed in Fig. 2. R—S is the height of the eyepoint (assumed as 5 ft. which is about normal in ordinary passenger cars today) above the road or ground level G—G'. P—P' indicates the picture plane and thus S—P' is the station point distance (assumed as 10 ft.). The zone filter plate 10 constitutes a secondary picture plane, and whereas the perspective data dimensions are shown on a relatively small scale the eye E and filter plate are shown on a relatively larger scale, the order being about 1 ft. for the perspective data scale to 10 mm. for the eye and filter plate scale. However since each of the two diagrams drawn to said two scales respectively is true to dimension within itself, it follows that when said diagrams are properly superposed as shown in Fig. 1, a common view angle such as the maximum angle of depressed vision, ∠ CRP', will apply to both, the figure thus showing the assumed diameter of 45 mm for the zone filter plate to be ample to insure vision within the margin of the filter plate. The optical axis extending from the eye point R to the horizon intercepts the picture plane at C and passes thru the poles of the filter plate 10.

The field of view of the motorist driver is diagrammed in Fig. 2, which shows the projection in parallel perspective of this field of view in the picture plane P—P' on a scale such that the height of the horizon line H—H' is about 5 ft. above the ground line G—G'. C is the eye center and vanishing point, D is the distance point. For a critically dazzling position of a pair of approaching headlights $L_2$ and $L_3$, a lateral distance of 6 ft. between the vertical meridian V—V' in the picture plane and a midpoint intermediate the headlights is assumed with a spacing of 3 ft. for the light centers, an aperture of 1 ft. for the lights and a level L—L' of the lights, 2 ft. below the horizon line and 3 ft. above the ground level at the picture plane. At infinity these lights merge at C and their trace as they approach the picture plane from the point C is embraced by the triangle JCQ, which is the glare zone of the headlights $L_2$ $L_3$. CJ and CM are shown in full lines because they do not extend beyond the picture plane, MQ is shown in dot and dash lines because it is CM produced to form an isosceles triangle for the glare zone JCQ. In passing, it is pointed out that the horizon H—H' and thus the height of C is determined by the observer's eye level. Accordingly for a motorcyclist, C would be below; and for many motor truck drivers, C would be above. The location of the headlights $L_2$ and $L_3$ vertically and laterally in the picture plane and the spacing of these lights is also variable. Accordingly the dimensions of the zone JCQ and its angular relation to the horizon line about C as a center is also variable. In practice the longitudinal dimension of the zone may be assumed as constant and with a rotative adjustment of the zone filter, to be coordinated to zone JCQ, about a center corresponding to C, the center C is constant. The assumed angle $2\theta$ of the zone according to observation under practical conditions rarely need exceed 30 degrees. But in practice, especially where a rotatably adjustable zone filter is contemplated, this value may be reduced by as much as one third, and thus the proportions assumed in Fig. 2 will be found to be adequate to meet headlight dimensions and road conditions current at this time.

The center C, the primary axis I—C and the secondary axis N—N' are zone and filter datum. In the present embodiment, the zone, the filter maze and the filter plate 10 are mutually related with C as a common center. This is shown in Fig. 2 where the filter plate 10 has been projected on the picture plane in dotted lines on a scale coordinated to the scale of the diagram. The assumed diameter of the filter plate is 45 mm. The general contour of the maze corresponding to zone JCQ is also shown by the dotted lines 11, 12 and 13. The diameter of the circular element 11 of the maze contour is established by Eq. 2, being equal to $l+m$. The quantity $m$ is an increment added for practical reasons to insure the zone maze having a sufficient margin to compensate for inaccurate fitting of the filter to the eye and to anticipate moderate departures from assumed conditions. The value of $m$ in the present instance is from 2 to 3 mm. The sides 12 and 13 extend tangentially from the periphery of 11 and parallel to JC and QC respectively. While the maze extends to the margin of its support as shown in Fig. 2, it will be later shown that its radial dimension can be restricted to hold the maze contour well within the margin of the support 10. This will become apparent as the characteristics of the zone JCQ are developed in Fig. 3.

Figure 3:
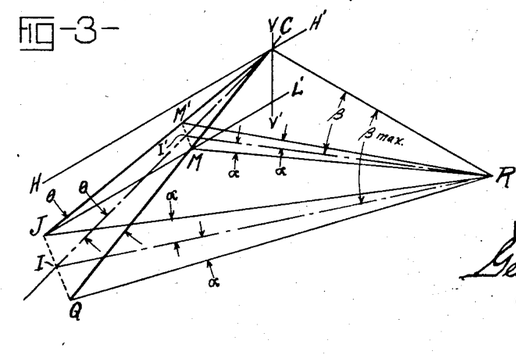

Fig. 3 is a perspective diagram resolving by simultaneous true dimensional projection, the data and substitute conceptions into a fundamental simplified mathematical proposition providing a basis for the rational invention and design of a zone filter to cope with the problem set forth in Figs. 1 and 2 and the foregoing disclosure.

The zone JCQ altho previously assumed as real for the sake of simplicity is actually a virtual image or projection of the glare zone and all that this comprehends. However its use greatly simplifies the problem and does not alter the actual data. For example, altho the light sources that are to be dealt with exist in the three dimensional object field and the radiations emanate from these sources per se: yet, if the projection or virtual image of any of these light sources on or in the picture plane be regarded as a light source or origin of radiation; this latter assumption is equivalent to dealing with the actual light source in the object field directly. Thus having obtained a plane projection JCQ constituting a glare zone to be dealt with, it is entirely proper to regard this as an object field and to assume all radiation as originating in this zone.

In Fig. 3 let JCQ be a plane figure representing the glare zone, CR corresponding to Fig. 1 indicate the line of sight or optical axis mutually perpendicular to JCQ and H—H', J—L' and V—V', corresponding to Fig. 2, indicate the picture plane wherein JCQ lies. The center C is the only point from which radiation may emanate and be normally incident at the eye point R. At this point the aspect angle is zero both in the secondary meridian N—N' (angle $\alpha$) and in the primary meridian I—C (angle $\beta$). The primary axis is assumed from practical considerations to be of such length CI that the angle CRI ($\beta$ max) that CI subtends is about 45°, and also this axis bisects the peak angle JCQ of the isosceles triangle JCQ. Accordingly IC is normal to and bisects the base JQ (which is parallel to axis N—N') and divides the triangle JCQ into two identical triangles ICJ and ICQ, the peak angles of these being each equal to $\theta$ inasmuch as JCQ equals 2$\theta$. Rationally, the axis IC should be chosen as a base line and preferably it is, under ordinary circumstances, because higher efficiency is obtainable; angular values are kept low, as also are variables; perfect optical balance is maintained; and maze design and construction are facilitated. IC is assumed as the base line in the $\beta$ meridian in Fig. 3.

From this figure it will be obvious that all radiation from the zone JCQ will be incident at R as an entrance pupil at aspect angles ranging from zero $\alpha$ and $\beta$ along the axis CR as previously noted, to aspect angles having a maximum $\alpha$ and $\beta$ value at J—R and QR. These then represent the limiting values, minimum and maximum, of $\alpha$ and $\beta$. The effect of the pupillary diameter ("$a$" Eq. 1) is omitted in our present considerations of $\alpha$ and $\beta$, because the angle subtended by "$a$" maximum at the distance RC is less than 8 minutes of arc and practical compensations in the construction of the filter more than cover this small angle. Unlike the condition present in a filter for a zone of uniform width, a fixed value for $\alpha$ will not suffice. Clearly, the aspect angle $\alpha$ varies in Fig. 3 as a function of $\beta$. The formula relating these variables is $$\tan \alpha = \tan \theta \cdot \sin \beta \quad \text{(Eq. 3.)}$$

where $\alpha$, $\beta$ and $\theta$ are as shown in Fig. 3. In this figure $\beta$ is entirely negative; $\theta$ below IC is negative and above, positive; $\alpha$ above the plane CIR is positive and below, negative. The sign convention merely indicates the direction of the angle with relation to their reference lines and does not affect computation.

The aspect angles $\alpha$ and $\beta$ and the maze contour have been developed and reduced to both qualitative and quantative data. The sensible dimensions of the eye pupil or other entrance aperture must be reckoned with as the maze is devised and developed. The usual expedient of regarding the aperture as an infinite number of elementary points is used and it is preferred, altho the points may be connected in any series of patterns to arrange them into lines or bands extending across the pupil in a direction corresponding to I—C in the object plane with each C end of the band assumed at the remote margin of the pupil. With a conception of the plurality of such bands generating the entrance pupil, the radiation from the object plane may be assumed as passing, instead of in pencils or cones, in stratified layers or cuneiform bundles (dihedral wedges) to the entrance aperture. Consonant with this would be a maze having a plurality of fissure like passages, tilted to exclude passage of radiation from within the zone JCQ while admitting radiation from the field plane area surrounding the zone. In more specific terms the maze would comprise a plurality of passages the cross section of each of which is elongated in the $\beta$ meridian and which are tilted about such an axis to intercept light incident on the maze within the $\alpha$ aspect angle, yet which passages will bypass or permit to pass to the entrance pupil such light as is incident at angles greater than the specific maximum $\alpha$ aspect angle prevailing at the point of incidence. By this means, the aspect angle $\beta$ is eliminated as a factor, and orientation in the $\beta$ meridian is obtained by virtue of the elongation of the cross section of the passage in that meridian.

In the following structure, the passages (shown in the $\alpha$ meridian section in Fig. 5) indicated by the center lines 15—15 to 18—18 inclusive: are virtual, existing by virtue of pairing entrance and exit apertures; and their walls are provided for by substituting the respective projectors of these walls in the grid bars of the filter maze grating.

Figure 6:
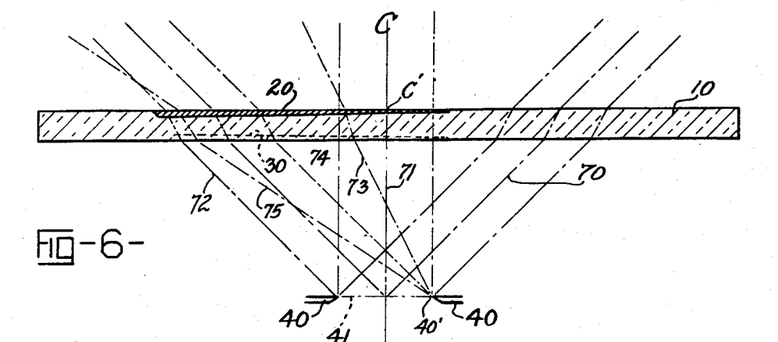

The grating consists of a pair of mutually complementary grids, that grid intended to face the light source being the anterior grid and its companion grid arranged behind the former in the direction of light passage being the posterior grid. The anterior grid is shown in elevation in Fig. 8 mounted on its support or filter plate 10 and the posterior grid likewise in Fig. 9, the relative positions in which these grids are shown being that due to rotating the filter plate 180° about a vertical axis. The comparative proportions and locations of the grids are shown in the composite view Fig. 4 wherein the upper and lower portions of the figure illustrate corresponding portions of the anterior grid and the central portion of the figure illustrates a corresponding portion of the posterior grid. In Fig. 5, the anterior grid bars show, in section, at the left or anterior surface of the filter plate, while the posterior grid bars show at the right or posterior surface of the filter plate. In Fig. 6, the anterior and posterior grids are shown at the upper and lower surfaces, in full and in dotted lines, respectively.

The anterior grid should have an odd number of bars 20 resistant or opaque to the passage of light, which bars are separated by an even number of intervening transparent spaces 21. These spaces 21 constitute the entrance pupils of the filter maze or grating. The posterior grid, correspondingly, has one bar less than the anterior, an even number of bars 30 similar to bars 20, and one space less, an odd number of intervening spaces 31 similar to 21. The spaces 31 constitute the exit pupils of the grating. The central bar 20 of the anterior grid and the central space 31 of the posterior grid are mutually co-axial with the central axis of the grating, denoted as I—C in Fig. 2 and 6—6 in Fig. 4, and in the co-ordinate direction, corresponding meridians such as 5—5 (corresponding to N—N' in Fig. 2) are in registry. The grid pattern shown in the present embodiment of this invention as illustrated is of the uniform interval type, and altho the intervals may be varied or mixed according to the technical requirements of design, for example to alter the characteristics of the illumination distribution curve of the grating across a transverse axis, the use of the uniform interval grid has been deemed preferable in the grating herein detailed.

In the construction of a grid pattern, consider the anterior grid shield contour to be subsequently inscribed in the inverted trapezoid 1, 2, 3, 4 indicated in broken lines about the shield. The axis 5—5 of the grid shield is assumed as 4.242 mm. above the convergent end of the trapezoid; the divergent end of the trapezoid, 15 mm. above the axis 5—5, making the trapezoid 19.242 mm. in altitude; the axis 6—6 of the grid shield is assumed to bisect the trapezoid equally; the width of the convergent end 3—4 is 6.354 mm.; the width of the divergent end 1—2 is 14.95 mm.; the angle included between the axis 6—6 and either side 1—4 or 2—3 of the shield or trapezoid 9⅜ degrees; the radius of the arc at the convergent end of the shield 5.067 mm., this radius having its center at 7 and being tangent with each of the sides 1—4 and 2—3 at the axis 5—5 and tangent with the trapezoid end 3—4 at the axis 6—6; and the width of the shield at the axis 5—5 is 10 mm.

The convergent end 3—4 and the divergent end 1—2 of the trapezoid are each divided into twenty-five equal parts or intervals and lines are drawn from end to end of the trapezoid between the points indicating these intervals to develop them into a group of twenty-five similar divergent stripes or bands uniformly covering the surface of the trapezoid. Beginning with the outer stripe at either side of the trapezoid and indicating, say by hatching, each of the odd numbered stripes entirely across the trapezoid, the indicated stripes constitute the bands of the anterior grid pattern according to their nominal or "pitch" dimensions. This anterior grid pattern layout will consist of 13 bars with 12 intervening spaces and the central bar will be co-axial with the axis 6—6. If, now, another identically striped trapezoid be plotted from this anterior pattern, but with the two marginal bands omitted and again, beginning with the outer stripes, each alternate stripe is hatched to indicate a band, the resulting 12 bands and 11 intervening spaces will constitute the posterior grid pattern layout. The central space will be co-axial with the axis 6—6 and in both instances the axis 5—5 is assumed as identically located with respect to the upper and lower ends of the trapezoid, to which it is parallel. Hence, if the two pattern layouts were drawn on transparent material and one superposed on the other, the patterns would be found to be mutually complementary, the posterior bands would just fit into the anterior spaces and together the two patterns would make a solid trapezoid.

Figure 4:
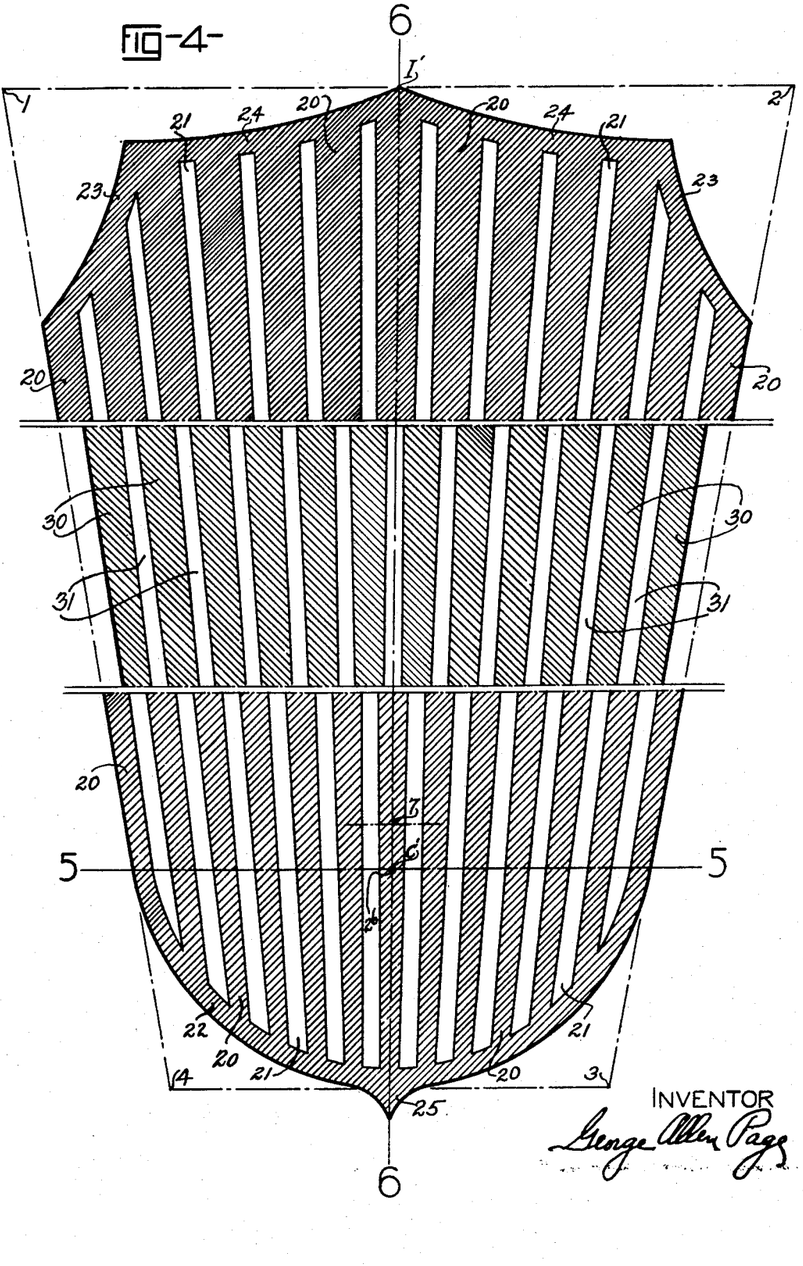
Fig. 4 being an enlarged front elevation of supplementary portions of the anterior and posterior grids of the filter grating.
Figure 7:
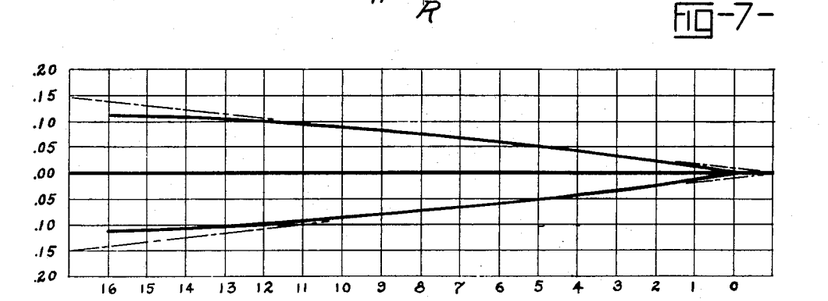
Fig. 7 being a graph of the grid addendum values.

These grid patterns as developed according to their pitch lines, if set in registry and spaced as shown in Fig. 5, would have the normal $\beta$ aspect single value for the grating of the specific filter being described, but would have an $\alpha$ aspect angle of zero. For some problems of filter design this is acceptable or satisfactory, but for the specific class of problem under consideration as indicated in Figs. 2, 3 and 11, a certain tangible value for the $\alpha$ aspect angle must be incorporated. This alpha quantity has been given by Equation 3 and is plotted with correction for refraction in Fig. 7 on a basis of a 2 mm. separation of the grids and gives directly the value of the addenda $\omega$ which, when simultaneously added to the bars and deducted from the spaces of a grid pattern will transform the latter into one providing the required alpha value. In Fig. 7 the abscissa scale reads in mm. as measured from bottom to top of the grids as shown in Fig. 4, and the ordinate scale in hundredths of millimeters, the median zero line of the graph corresponding to the center line of a band, the upper curve the right half of the band and the lower curve the left half. Theoretically, the zero abscissa and ordinate point or origin would indicate the point C' of the shield, but owing to the diameter of the entrance pupil of the eye behind the filter this point is moved down to the line 3—4.

As indicated by the broken line in Fig. 7 the $\omega$ value curve very closely approximates a straight line having a slope of .008 to 1, and this substitute straight line has been used for generating the addenda $\omega$ in the grids herein shown and described.

Referring to the grid pattern trapezoids herein above developed to their pitch values, these are each of an altitude of 19.242 mm which is assumed as the length of the grid bars. The value of the addendum $\omega$ to the bars at the line 1—2 is thus .15 mm on each side of each band, whereas the value of $\omega$ at the end 3—4 of the trapezoid is zero. The addenda should be added to the outer edges of the marginal bands of the posterior pattern, but its addition to the outer edges of the marginal bands of the anterior pattern is optional. In Fig. 4 it has been added to the marginal bands of the anterior pattern also, to preserve the appearance of uniformity of the bands. Thus are obtained the form, dimensions and location of the anterior grid bars 20 and the intervening openings or spaces 21 shown in Fig. 4 and also the bars 30 of the posterior grid and its openings or spaces 31 shown in the same figure. The trimming off of the surplus corners of the trapezoids by the development of the heraldic shield contour or other ornamental shape approximating the required outline of the grating seems to be obvious without detailed description. The arc formed by the band 22 (of a width of ½ mm) is the projected outline per se and in addition to enhancing the appearance of the shield ties the contiguous ends of the bands together. The radius for the anterior arc has been given, that of the posterior shield is adapted to keep the posterior arc within and approximately the same as 22 and to be tangent to the outer edges of the outer bands of the posterior shield and tangent to the end 3—4 of the posterior pattern trapezoid. The theoretical limiting contour of the divergent end of the shield is obtained by striking an arc across this end of the trapezoid on a radius of 15 mm with C' as a center (45° $\beta$) and rounding off opposite portions adjacent the intersection of such an arc with the sides of the trapezoid with a 3 mm radius. (radius of eye pupil) and opposite portions adjacent the tangent point I' of such an arc with the end 1—2 of the trapezoid. Thus the concave arcs of the head band of the shield, viz. 23 and 24, follow the natural contour closely and with the point 25 carry out a simple ornamental heraldic shield effect. The grid shield patterns have thus been completely developed ready for mounting upon or applying to the opposite surfaces of a glass or other transparent support 10 having a thickness $t$, in the present instance, of 2 mm.

The support is shown as flat for simplicity and convenience. It may be curved or lenticular. If the curvature or variation in thickness be not too large, then the patterns will be the same as tho the support was flat and of uniform thickness $t$. If on the other hand, the curvature or thickness variation be sufficiently great, the patterns are modified to adapt them to the peculiarities of the support. This is a matter of the technique of the optician.

Assuming that the anterior and posterior shield grid patterns have been applied in exact registry to the corresponding surfaces of the support 10 as illustrated in Figs. 5, 6, 8 and 9; the operation of a zone filter placed before the eye of an observer, as shown in Figs. 5 and 6 can be explained. As shown in these figures, the patterns are assumed as impressed into the surfaces of the support and filled with an apaque material, the whole being finished flush with the surface of the support. The edges of the bars are assumed to be sharp and non-reflective and the interior surfaces inert and non-reflective. And the bars are assumed to be opaque throughout their extent.

In Figs. 5 and 6, C—R is the optical axis common to the zone filter indicated generally by 10, and the entrance pupil schematically indicated by the diaphragm 40. The line 41 indicates the plane contiguous to the vertex of the entrance surface. Thus 40 and 41 indicate the cornea and entrance pupil of the eye which for present purposes may be assumed as coincident. The distance from the adjacent surface of the filter and 41 as shown in Figs. 5 and 6 is the usual corneal distance.

All light entering the eye must either pass thru the filter grating or thru the support around the filter grating. In the meridian of Fig. 5 a central bundle of rays embraced within a cuneiform dihedral angle indicated by the ray lines 50 and 60 must pass thru the filter grating alone, and this is also true of all rays incident upon the entrance surface of the filter at an angle no greater than the angle of incidence of the ray lines 50 and 60. When the angle of incidence increases to that indicated by the lines 51—61, as shown in Fig. 5 the two halves of the pupil receive light thru the grating and thru the support beyond the margin of the grating from two directions respectively. Until finally at an angle such as indicated by the rays 52—62, the pupil cannot receive light through the grating but receives all its light through the support beyond or laterally of each edge of the grating. Light, as used here refers to image forming rays.

The alpha aspect angle or including both plus and minus alpha in one expression, the angle $2\alpha$, is shown in Fig. 5 by the lines 53—63. No light except as specifically provided for by leakage as later explained, can pass thru the grating at an angle having a smaller angle of incidence than $\alpha$ and it follows that no light within $\alpha$ can enter the eye. This is the primary function of the addenda $\omega$ which, being added to the pitch width $i$ of the bands 20 and 30 and deducted from the pitch width $i$ of the grid spaces or apertures 21 and 31, increase the band widths to $b$ and decrease the aperture widths to S. Thus it will be seen that each of the bands 20 and 30 extends laterally beyond both edges of the corresponding opposed space or aperture 21 and 31, that is, each of the bands overhangs, laterally, the grid aperture directly opposite to it. In addition to providing, quite obviously, for the alpha function of the filter or expressed optically projecting or casting the zone shadow on the retina or other focal plane, the encroachment of the bands into the adjacent light passages thru the filter grating also eliminates the occasional possibility of objectionable dispersive and diffractive effects from the image field obtained thru the filter.

Enlarging somewhat on the charting of the passages thru the grating, beyond the indication of their centers by the lines 15—16—17 and 18; the opening and closing angles of these respective passages are also indicated in Fig. 5. The alpha line 63 is an indication of the opening angle of passage 16 and the alpha line 53 of the opening angle of 17. The closing angle of passage 16 is indicated by the line 64 and the closing angle of 17 by 54. 65 and 55 represent the opening angles respectively of the passages 15 and 18, which it will be seen are of the second order; passages 16 and 17 being of the primary order. The closing angles of the passages 15 and 18 are indicated respectively by the lines 66 and 56.

It is often desirable to permit a certain percentage of light from the glare zone to penetrate the filter. The light thus admitted tends to soften the alpha shadow somewhat or merely to permit the most brilliant of the high lights in the glare zone to be dimly discerned. The degree of alpha shadow penetration permitted is usually very small, in the present embodiment it may be of the order of 1 in 1000 or one tenth of one per cent. This penetration is obtained by leakage and may be provided for in three ways. First, the grid bars may be made flat in cross section and transparent to the percentage of leakage required; second, the addenda $\omega$ for one or more of the bars and spaces, preferably central ones, may be made minus, that is a dedendum may be deducted from the bar and added to the adjacent space; or third, one or more of the bars may be perforated or provided with a leakage port or window. Accordingly the circular aperture or transparent port 26 is formed in the central band of the anterior grid shield. This port is flared inwardly to widen the view angle therethru and may be supplemented by other ports, for example, to extend the view angle.

In Fig. 6, which shows the entire filter in section and its relation to the eye in a central meridian perpendicular to that of Fig. 5, namely the axis 6—6 of Fig. 4: the filter passages are slot-like and extend in the direction of the section axis. The aspect angle having been completely compensated for in the direction of the 5—5 or N—N' meridian, no such compensation is necessary in the section meridian of Fig. 6, as made clear from previous description. The bundle of rays 70 entering the eye or entrance pupil 40 from the right pass by the arcuate end of the grating, thru the filter support 10 as shown and into the eye; the central bundle of rays 71 (from the extra-zonal field) passing thru one of the central passages of the filter grating enters the pupil 40 as shown; and the marginal bundle of rays 72 entering the filter passage, referred to in connection with the central bundle, from the left passes thru the filter grating as shown and proceeds to the entrance pupil 40 as usual. This covers the normal angle of view or orientation and all other light incident at intervening angles in the plane of the light passage chosen for examination acts similarly to one or the other of the three principal ray bundles shown. In describing the characteristics of the filter in the meridian in which it is shown in Fig. 6, it is pointed out, as is clear from Fig. 4, that as a light beam entering initially from the right at 70 is swung to the left thru 71 to 72: the illumination carried by that bundle to the eye diminishes. To be sure, the change from 70 to 71 is both abrupt and obvious, but the continued diminishment of the illumination value of a beam of light having the area of the eye pupil, as this beam is oriented from 71 to 72, is gradual and occurs as a function of the flare angle $\theta$ of the glare zone. This is consonant with the requirements of the object field and its illumination, this field having higher illumination, easier visibility and is less critical as a rule at portions other than at its center and margins.

The complexity introduced by each element of the area of the eye lens surface constituting an image forming element, and the consideration of a row of these elements across each of the meridians of the pupil as shown in Figs. 5 and 6 have been previously described and reconciled to a process of design of the grating. Three such points are shown in Fig. 5, at the upper edge, center and lower edge of the pupil. In Fig. 6 the criterion point 40' on the 6—6 meridian of the eye lens at 40 is shown and the right marginal ray of the beam 71 constitutes the normally incident ray to the point 40'. On Fig. 7, the intersection of this ray with the filter grating has been assumed to correspond to zero on the abscissa scale. Rays 73, 74 and 75 at their points of incidence with the filter grating have a tangential spacing of 5 mm from one to the next and thus respectively correspond to intervals 5, 10 and 15 on the abscissa scale of Fig. 7. From the foregoing, and by inspection of Fig. 4, it will be clear that for each meridian parallel to 5—5, between the convergent end at the point 25 and the divergent end at the crown I' of the filter grating, an illumination curve will have a different shape and a descending value from 25 to I'. But, by taking the axis 5—5 as a criterion, since this axis co-incides with a diametral meridian of the eye pupil and, over the area co-extensive with the pupil, the values and characteristics at 5—5 constitute a mean; a transmission and filtering effect curve, Fig. 10, plotted for the axis 5—5, is assumed as an average or mean datum for the combination of eye and filter when they are in normal position as indicated in Figs. 5 and 6, that is when the eye and filter grating are coaxial.

Figure 10:
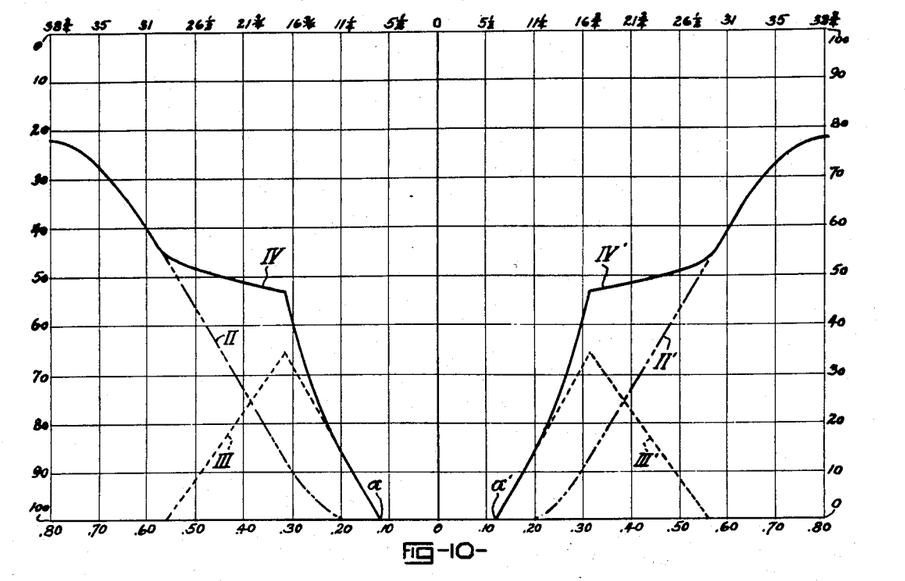
Fig. 10 being a graph including several curves of light entering the eye in the plane of Fig. 5, the latter showing interception and bypassing of image forming pencils approaching the entrance pupil of the observer, and Fig. 11 being a pictorial view, co-ordinated to the foregoing figures, of the zone filtered field of view of a motorist facing an approaching motor car at night, the eyes of the motorist being in the fully shielded position behind a pair of zone filters made for motorists according to the present invention.

In the graph, Fig. 10, the abscissas indicate the inclination of the light rays entering the eye and the ordinates indicate the percentage of light entering an eye behind the zone filter herein specifically described, a full beam of light entering a 6 mm pupil parallel to the optical axis being presumed as 100%. It is pointed out in passing, that the inclination of the beam alone has such a noticeable effect in reducing its effective illumination, aside from reflection losses, that at an inclination of about 40 degrees about 20 per cent loss occurs due to the area of the cross section of the beam being correspondingly less than the area of the frontal projection of the beam. The central ordinate axis divides the graph into angles inclined with say a minus inclination (counter-clockwise) to the left of said central ordinate axis and a plus inclination (clock-wise) to the right of said central ordinate axis; the eye center being taken as a vergence or origin point of the angles. The abscissa scale at the foot of the graph chart gives the angle in terms of its tangent, whereas the scale at the top gives the approximate angle in degrees. The ordinate scale at the left, ascending from top to bottom gives the percentage of light intercepted by the filter, whereas the ordinate scale at the right gives the percentage of light transmitted. The curve II—II' indicates the illumination reaching the eye to the exception of that passing through the filter maze or grating, just as tho the latter were a mere opaque patch on the otherwise plain glass disc support. The curve III—III' indicates the illumination transmission of the filter grating per se as shown in Fig. 5. The curve IV—IV' is the summation of curves II—II' and III and III' combined and indicates the total illumination reaching the eye with the zone filter before it.

The interval or gap $\alpha$—$\alpha'$ wherein the values of the curves III—III' and IV—IV' are zero represents the interception zone of the filter covering the alpha aspect angle produced by the addenda $\omega$. Obviously as $\omega$ is reduced the inner legs of the curves III—III' and IV—IV' move toward one another and increase in altitude and the outer legs of III—III' move outward somewhat. The inner legs of these curves approach zero as a limit as $\omega$ approaches zero. The "leakage" referred to previously is too small to show on the graph.

The curve II—II' is constant for a given diameter of the grating and is not very sensitive to variations within the practical limits of the width of the grating, which as above pointed out cannot be reduced much beyond its present value and need not be increased. But the curve III—III' is susceptible to variation both as to shape and value to a very considerable extent by the grid patterns. For example, by using a pattern having a very narrow central band and having each band increasing in geometrical ratio as they approach the margin of the grid, each half of the curve III—III' would simulate somewhat a trapezoid having a somewhat steeper rise on the inner side and a shallower decline on the outer side.

The filter has been described and illustrated objectively in detail. Yet in the ophthalmic application of the zone filter, the test of satisfaction rests largely on the subjective effect of the filter on the user or observer under the conditions for which it is designed. Fig. 11 then may be regarded as illustrating a subjective test of the zone filter herein described. This figure has been plotted and illuminated not only according to the mathematical data hereinbefore set forth, but also in agreement with actual road tests of the zone filter.

Figure 8:
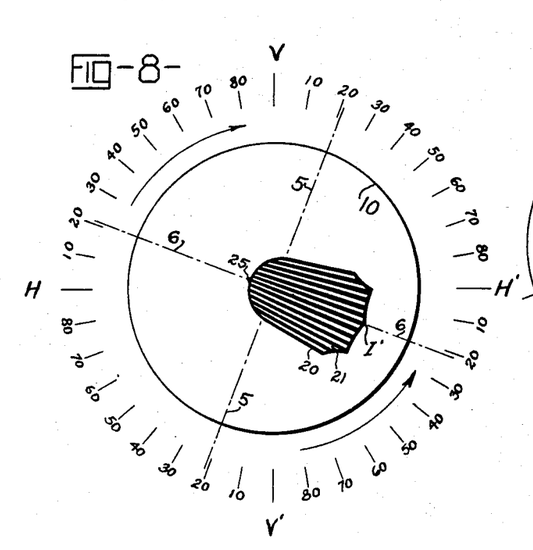
Figs. 8 and 9 being respectively front and rear elevations of a complete filter and lens disc, Fig. 8 showing the anterior grid circumscribed by a protractor scale and arrows to illustrate the rotative adjustment or positioning of the lens and filter for universal use and Fig. 9 showing the posterior grid.
Figure 9:
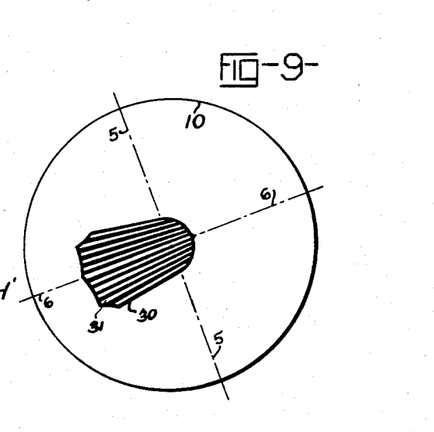

Assuming the observer to have donned a pair of zone filters and set them rotatively within their mounting in the position shown in Fig. 8 (viewed by a person looking at the observer), or in Fig. 9 (if the filters be viewed posteriorly), and that the observer is the driver of a motor car approaching the car shown in Fig. 11: then Fig. 11 is a picture of the principal portion of the field of view of the observer when he is looking straight ahead and thru the filter. The zone JCQ in Fig. 11 corresponds to JCQ in Fig. 2. However, whereas in Fig. 2 JCQ is a glare zone, in Fig. 11 JCQ is an alpha shadow zone. Thus at all points in its travel the headlights of the car shown remain within the shadow zone and likewise no matter how long a line of cars are ranged behind the car shown, their headlights are all included within the shadow zone. The alpha shadow zone virtually intercepts the direct light from these headlights, but permits the observer to obtain all benefit of the useful light shed upon the road and landscape by the approaching headlights and of course by his own headlights. Yet the zone is so narrow that as may be seen from the picture the approaching cars are distinctly visible and, with alpha shadow "leakage" provided, the approaching headlights are themselves dimly visible as shown, but co-ordinated in contrast to the road illumination.

The width of the glare protecting shadow zone is designed to permit of a sufficient amount of latitude to accommodate quite a considerable displacement of the glare zone out of its usual limits without requiring the shifting of the axis 6—6 of the filter. For example in Fig. 11 the car shown is presumed to be only about ten feet ahead of the approaching observer's car and too close for a comfortable passing. But for special road conditions such as long bends in the road and acute intersections, when also facing a railroad locomotive, or when other lights intrude as the major glare zone: the filter grating and consequently the alpha shadow zone is rotated to cover and neutralize the glare zone. Or of course this rotative movement of the filter about its optical axis may be used as an adjustment to obtain substantial registry between the filter and any glare zone. This rotative movement or angular adjustment of the filter gratings is indicated in Fig. 8 by the protractor scale surrounding the filter support and the arrows. This schematic representation appears to be adequate since the use and construction of mountings for holding lenses and the like before the eyes, wherein a pair of lenses are rotatably adjustable either in unison by the adjustment of one of them or independently by individual adjustment or shifting of each of them, are known in the prior art.

Assuming that the central peak I' at the eccentric divergent end of the filter grating is the indicator pointer co-operating with the protractor scale of Fig. 8, the position shown is a usual setting of the filters for night driving against approaching automobile headlights, where traffic drives to the right. About 22 degrees below H would be the corresponding setting for places where traffic drives to the left, or for a glare zone simulating this condition. V' as a setting would relieve reflection of the sun ahead on the water, or on a shiny road, or on the hood before the driver. V would be a setting for the sun, low and directly ahead. And various positions between H and V and H' and V would constitute settings for various positions of the sun, of locomotive headlights, street lights and for other miscellaneous conditions. Thus mounted, the filter is adapted for universal use and the presumed desirability of rotative adjustment is the reason for the preference for the optical center C' of the filter grating being set co-incident with the center of the support. Otherwise, other locations of the filter grating, for example an eccentric setting such as below the center as with the reading portion of a bifocal ophthalmic lens, may be preferred.

But it is important also to observe that the filter grating has been limited in area with respect to the area of the filter plate or lens constituting its support, and so shaped that it is very easy for the user of this filter to look completely over, under or to one side of the filter grating, just as tho the latter had been removed. This has been deemed preferable, even with central positioning of the gratings, to swinging the filters out from before the eyes, because the latter method is rather clumsy and slow.

As it is, the driver normally looks over (or if he prefers under) the filter set as shown in Fig. 8 when the road is clear of glare and as glare intrudes he merely tilts his head to bring the filter into play, just as a user of bifocals would do. If greater width of zonal protection is desired the head may be swung to shift the center of the eye nearer to the I' end of the filter, if less, then the center of the eye may be shifted in the opposite direction. Ordinary orientation of the eye behind the filter is provided for in the proportioning and balance of the filter, and as the eye is moved from outside the filter to a position behind it or vice versa there is no harsh or uncomfortable change nor is there any movement or change in the image other than that due to co-ordinated illumination.

The use of a uniaxial grid pattern symmetrical on opposite sides of its principal axis is preferred as an advantage optically and subjectively it insures the comfort of the user, especially in cases of uncorrected astigmatism.

Where desired, the anterior grid shield may be embellished within the margins of the bands and their framing. But the structure and construction of the zone filter herein specifically described may be widely departed from without departing from the generic invention hereinabove disclosed.

Having described a single embodiment of my invention, I claim

1. A zone filter adapted to be disposed in front of and in close relationship with the entrance pupil of an optical system and to intercept light passing from a glare zone to said entrance pupil and to by-pass light from the extra-zonal field to said entrance pupil embodying a transparent support incorporating a filter grating located and contoured in accordance with the glare zone and entrance pupil projections, said grating comprising an anterior grid formed by a pattern co-ordinated to the grating contour and glare zone and a posterior grid formed by a pattern complementary to that of the anterior grid, said patterns being modified by addenda co-ordinated to the aspect angles of the glare zone.

2. The combination with the entrance pupil of an optical system and an object field divided into a glare zone and an extra zonal portion, of a zone filter adapted to be disposed in front of and in close relationship with said entrance pupil comprising a transparent support incorporating a filter grating contoured and proportioned according to the combined aspect angles of the glare zone and the diameter of the entrance pupil, said grating embodying an anterior grid having a pattern of alternate bars and spaces and a posterior grid having a pattern constituting substantially the negative image of that of the anterior grid, said grids being mounted on the corresponding surfaces of the transparent mounting with the spaces of one in central and longitudinal registry with the bars of the other, the width of the bars and spaces of the grids being respectively increased and diminished according to the accepted value of the alpha shadow addenda and dedenda.

3. The combination with the entrance pupil of an optical system and an object field divided into a glare zone and an extra zonal portion, of a zone filter adapted to be disposed in front of and in close relationship with said entrance pupil comprising a transparent support incorporating a filter grating contoured and proportioned according to the combined aspect angles of the glare zone and the diameter of the entrance pupil, said grating embodying an anterior grid having a pattern of alternate bars and spaces and a posterior grid having a pattern constituting substantially the negative image of that of the anterior grid, said grids being mounted on the corresponding surfaces of the transparent mounting with the spaces of one in central and longitudinal registry with the bars of the other, the width of the bars and spaces of the grids being respectively increased and diminished according to the accepted value of the alpha shadow addenda and dedenda, and a leakage port provided in a co-operating band and space whereby the alpha shadow may be penetrated by a limited value of light from the glare zone.

4. A zone filter for use in front of and in close relationship with the entrance pupil of an optical system for intercepting light from a glare zone and by-passing light from the extra-zonal field, comprising a filter maze contoured in accordance with the combined projections of said glare zone and entrance pupil, said maze embodying an anterior grid and a posterior grid, each of said grids having a pattern of alternate narrow light intercepting portions and narrow light transmitting portions, and light transmitting means for holding said grids in spaced relation with the light intercepting portions and light transmitting portions of one disposed opposite the light transmitting portions and light intercepting portions of the other respectively, the widths of the light intercepting portions and light transmitting portions of one of said grids being coordinated to the aspect angles of the glare zone.

5. A zone filter for use in front of and in close relationship with the eye for intercepting light from a glare zone and by-passing light from that portion of the object field surrounding said zone, comprising a transparent support incorporating a filter maze located and contoured in accordance with the combined projections of the glare zone and entrance pupil of the eye, said maze comprising a pair of complementary grids each having spaced light intercepting elements, said grids being disposed at opposite surfaces of the support respectively with their respective elements embedded therein and with the elements of one in substantial registry with the light passages intermediate the elements of the other, the elements of both grids having sharp edges at the surfaces of the support and non-reflective surfaces within the medium of the support, the elements of at least one of said grids being proportioned in width in accordance with the aspect angles of the glare zone.

6. A zone filter for use in front of and in close relationship with the eye for intercepting light from a glare zone and by-passing light from that portion of the object field surrounding said zone, comprising a filter maze located and contoured in accordance with the combined projections of the glare zone and entrance pupil of the eye, said maze comprising a pair of complementary grids each having spaced light intercepting elements, transparent supporting means for holding said grids in spaced relation with the elements of one disposed opposite the spaces intermediate the elements of the other, the elements of at least one of said grids being modified in width in accordance with the aspect angles of the zone, and light transmitting means within said maze for by-passing a limited amount of light from the glare zone.

GEORGE ALLEN PAGE.